United States Patent [19]

Dunstheimer

[11] 4,059,869

[45] Nov. 29, 1977

[54] ANIMAL HOLDER

[76] Inventor: Mathias Dunstheimer, No. 48, Holzheim, Germany, 8851

[21] Appl. No.: 617,138

[22] Filed: Sept. 26, 1975

[30] Foreign Application Priority Data

Sept. 27, 1974 Germany .............................. 2446370

[51] Int. Cl.$^2$ .............................................. A22B 1/00
[52] U.S. Cl. .......................................... 17/44; 17/14; 17/17; 17/44.2; 24/248 R; 24/249 R; 119/151; 119/103
[58] Field of Search ................... 17/44, 44.2, 44.3, 21, 17/44.1, 14, 17, 1 A; 119/103, 98, 101, 96, 151; 248/121, 316 D; 269/90; 24/249 SL, 249 FP, 249 R, 248 L

[56] References Cited

U.S. PATENT DOCUMENTS

| 39,566 | 8/1863 | Gregg | 119/98 |
|---|---|---|---|
| 62,332 | 2/1867 | Heyden | 248/316 B |
| 574,564 | 1/1897 | Nilson | 17/44 |
| 623,606 | 4/1899 | Homan | 248/316 B |
| 1,677,953 | 7/1928 | Campbell | 119/151 |
| 1,895,156 | 1/1933 | Fisher | 248/316 B |
| 2,584,377 | 2/1952 | Wunderlich | 17/44.1 |
| 3,117,555 | 1/1964 | Hayden | 119/151 |
| 3,530,834 | 9/1970 | Hollenback et al. | 119/96 |
| 3,693,595 | 9/1972 | Stewart | 119/103 |

FOREIGN PATENT DOCUMENTS

| 1,267,202 | 3/1972 | United Kingdom | 17/44 |
|---|---|---|---|
| 1,239,569 | 7/1971 | United Kingdom | 17/44 |
| 994 of | 1904 | United Kingdom | 17/44.3 |
| 14,348 | 4/1916 | United Kingdom | 17/1 A |

Primary Examiner—Louis G. Mancene
Assistant Examiner—John J. Wilson
Attorney, Agent, or Firm—Behr & Woodbridge

[57] ABSTRACT

An animal holder to fix the abdominal portion of an animal in a hanging position with the head down for treatment restrained from movement. The holder comprises a stand and a tongs-like clamping member mounted thereon and comprising two clamps adapted to enclose the abdominal portion of the animal near the hind legs. One of the clamps is rotatable round a vertical axis and lockable.

2 Claims, 3 Drawing Figures

ANIMAL HOLDER

BACKGROUND OF THE INVENTION

1. Field of the Invention

This invention relates to a device for holding animals during manipulations carried out on the body of the animal and, more particularly, to a device permitting an easy, simple and safe operation during the castration of piglets.

2. Description of the Prior Art

For supporting bodies of living animals during surgical operations or other manipulations on the body of the animal, there has been known essentially three possibilities:

First, a second person holds the animal by its hind legs, which procedure is not only expensive with respect to the expenditure of labour and inconvenient (heavy), but also unsafe, especially in case the second or aiding person legs the animal go, e.g. after having been frightened.

Second, in a castration device for piglets described in British Patent No. 1,239,569 the animal, being in a hanging position, is held simultaneously by the hind legs and the trunk. This position, however, involves pain for the animal and a not very quiet state of the testicular area, since there is a considerably large distance between the two fixing points located at the hind legs and the trunk, so that the animal may carry out unexpected jerks with that portion of its body extending between the fixing points, which would, of course, hinder the operating person in his work. Moreover, the construction of this device is rather complicated. A simpler construction has been known from British Patent No. 1,267,202, in which the piglet is fixed in a hanging position by its hind legs only; thus, however, it will hang by far less quietly.

Third, from U.S. Pat. No. 2,781,740 there has been known a castration device for piglets, in which the animal is strapped in a supine position. This position, however, the intestines exert a pressure on the testicular area, which renders the operative working more difficult (danger of perforation); in addition, the strapping of the piglets is time- and labour- consuming.

SUMMARY OF THE INVENTION

It is, therefore, an object of the invention to provide a device permitting a precise and safe operation on the abdomen of animals. A further object of the invention resides in that the operation shall be carried out in an ideal position of the animals without causing unnecessary pain. A still further object of the invention is to provide a device by which the operation can be carried out without much expenditure of work. These and further objects of the invention will be apparent from the following description in connection with the accompanying drawings.

DETAILED DESCRIPTION OF THE INVENTION

In accordance with the invention there is provided a holding device for animals hanging with their heads down which device comprises a fastening mechanism for the abdomen of the animal and is characterized in that the fastening mechanism consists of a pair of tongs-like members arranged on a stand and embracing the abdomen of the animal immediately before its hind legs with two holding clamps (1,2), one of which is lockable and turnable round a vertical axis.

The device according to the invention permits the castration of piglets in a vertical hanging position (with their heads down). This has the advantage that the pressure of the intestines is shifted forward and pressure on the abdomen is thus relieved. In this way the testicles can be removed without any danger of the intestines being perforated or becoming injured. Additionally, the holding of the piglets before their hind legs tends to keep the piglet quiet and allows a precise and safe operation.

The following is a more detailed description of a preferred embodiment of the device according to the invention.

Figure 1:
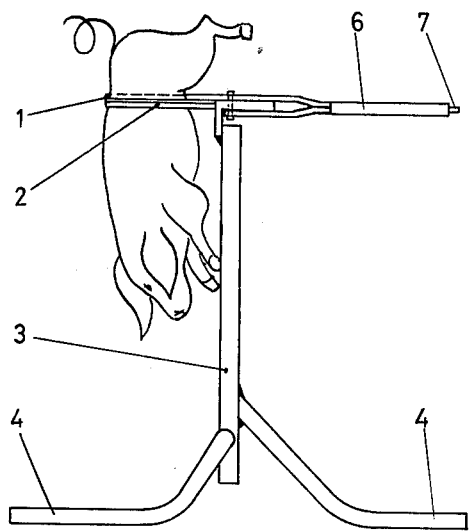
FIG. 1 is a front view of the holding device.

As illustrated in FIG. 1, the device according to the invention consists of a vertically arranged stand 3 having legs 4, the stand bearing at its upper end the real holding mechanism which is arranged horizontally. This holding mechanism consists of two holding clamps 1 and 2, arranged in the form of a pair of tongs and bent according to the shape of the animal body; one of the clamps 1 is turnable around a vertical axis, whereas the other clamp 2 is fixed and firmly connected with the stand 3. The turnable clamp 1 is further connected to a locking lever 6 which is capable of being released in a manner known per se in the prior art by push button 7 from the fixed engagement with a disc segment 5 which is horizontally arranged and fixed on the stand 3. The locking lever 6 can be locked again the when unlocked permits turning of clamp 1 around the vertical axis. The locking lever 6 includes a tooth means which is adapted to engage the teeth of the disc 5 when in the locking mode.

Figure 2:
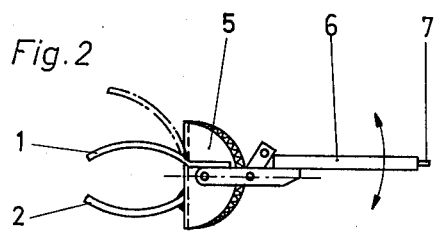
FIG. 2 is a plan view of the actual holding portion of the device as shown in FIG. 1.
Figure 3:
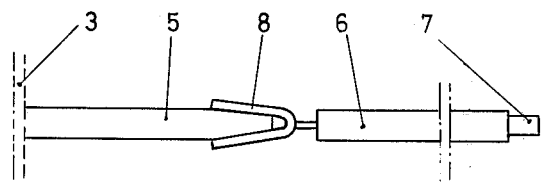
FIG. 3 is a front view of a preferred embodiment of the locking mechanism of the holding portion.

As shown in FIG. 2, the locking of the turnable clamp 1 can be brought about by engaging the locking lever 6 with a notch of the notched disc segment 5. In a particularly preferred embodiment of the device according to the invention, however, an infinitely variable adjustment of the opening of the clamps can be achieved. For this purpose, the disc segment 5 is tapered in a wedge-like manner towards lever 6. The wedge-shaped portion of disc 5 jammingly engages a correspondingly slanted fork 8 connected to locking lever 6 as shown in FIG. 3.

Thus, the holding device according to the invention can be infinitely or finitely adjustable according to the various sizes of different animals and according to the embodiment of the invention employed.

I claim:

1. A holding apparatus for hanging animals with their heads in the downward direction, said apparatus comprising:
   a stand;
   a first and second clamp means for embracing an animal immediately before its hind legs, said second clamp means being fixedly attached to said stand and said first clamp means being also connected to said stand and rotable about a vertical axis;
   a disc means connected to said first clamp means, said disc means including a plurality of notches on the periphery thereof;

a rotatable lever means associated with said disc means for moving said first clamp means relative to said second clamp means, said lever means being adapted to engage at least one of the notches on the periphery of said disc; and, a locking means for locking said first clamp means, relative to said second clamp means, whereby the first clamp means with respect to the second clamp means can be adjusted in finite discrete steps through the use of said lever means.

2. A holding apparatus for hanging animals with their heads in the downward direction, said apparatus comprising:

a stand;

a first and second clamp means for embracing an animal immediately before its hind legs, said second clamp means being fixedly attached to said stand and said first clamp means being also connected to said stand and rotatable about a vertical axis;

a disc means connected to said first clamp means, said disc means having a wedge-like section on its periphery;

a rotatable lever means associated with said disc means for moving said first clamp means relative to said second clamp means;

a fork means attached to said lever means and adapted to jammably engage the wedge-like section of said disc means providing, a locking means for locking said first clamp means relative to said second clamp means, whereby said first clamp means can be adjusted by said lever means and is infinitely positionable with respect to said second clamp means.

* * * * *